US009788090B2

(12) United States Patent
Abbiati

(10) Patent No.: US 9,788,090 B2
(45) Date of Patent: Oct. 10, 2017

(54) USER MODULES AND METHODS FOR CONNECTING EXTERNAL COMMUNICATION NETWORKS

(71) Applicant: PRYSMIAN S.p.A., Milan (IT)

(72) Inventor: Fabio Abbiati, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 14/786,389

(22) PCT Filed: Apr. 24, 2013

(86) PCT No.: PCT/IT2013/000124
§ 371 (c)(1),
(2) Date: Oct. 22, 2015

(87) PCT Pub. No.: WO2014/174539
PCT Pub. Date: Oct. 30, 2014

(65) Prior Publication Data
US 2016/0073181 A1   Mar. 10, 2016

(51) Int. Cl.
*H04Q 11/00*   (2006.01)
*G02B 6/44*   (2006.01)
*G02B 6/38*   (2006.01)

(52) U.S. Cl.
CPC ....... *H04Q 11/0067* (2013.01); *G02B 6/4452* (2013.01); *G02B 6/3897* (2013.01);
(Continued)

(58) Field of Classification Search
USPC .......................................................... 398/45
See application file for complete search history.

(56) References Cited

U.S. PATENT DOCUMENTS

2007/0036507 A1\* 2/2007 Allen ................... G02B 6/4454
385/135
2010/0054681 A1   3/2010 Biribuze et al.
(Continued)

FOREIGN PATENT DOCUMENTS

EP    1160603 A1   12/2001
EP    2159617 A2    3/2010
(Continued)

OTHER PUBLICATIONS

International Search Report PCT/ISA/210 for International Application No. PCT/IT2013/000124 Dated Nov. 27, 2013.
(Continued)

*Primary Examiner* — David Payne
*Assistant Examiner* — Omar S Ismail
(74) *Attorney, Agent, or Firm* — MH2 Technology Law Group, LLP

(57) ABSTRACT

A user module for connecting an external communication network to a user network of a building may include: a box-shaped body; a plurality of adapters configured to associate to respective optical fiber units of at least one optical cable of the user network; and/or patch panel, between upper and lower walls of the box-shaped body, configured to receive the plurality of adapters and configured to define adjacent compartments within the user module. The patch panel may be housed in the box-shaped body. The patch panel may be configured to move between a rest position, at which the patch panel is completely housed within the box-shaped body, and a connecting position, at which the patch panel is at least partially extracted from the box-shaped body.

19 Claims, 7 Drawing Sheets

(52) U.S. Cl.
CPC ............... *H04Q 2011/0035* (2013.01); *H04Q 2011/0079* (2013.01)

(56) References Cited

U.S. PATENT DOCUMENTS

| | | | | |
|---|---|---|---|---|
| 2010/0310225 A1* | 12/2010 | Anderson | ............ | G02B 6/4455 385/135 |
| 2010/0322576 A1 | 12/2010 | Rhoney et al. | | |
| 2011/0085776 A1* | 4/2011 | Biribuze | ............. | G02B 6/4452 385/135 |
| 2012/0014656 A1 | 1/2012 | Adomeit et al. | | |
| 2013/0034336 A1* | 2/2013 | Cassell | ............... | G02B 6/4466 385/135 |
| 2013/0196538 A1* | 8/2013 | Takeuchi | ............... | H01R 13/58 439/571 |
| 2016/0073181 A1* | 3/2016 | Abbiati | ............... | G02B 6/4452 398/45 |

FOREIGN PATENT DOCUMENTS

| | | | |
|---|---|---|---|
| EP | 2264497 A1 | 12/2010 | |
| NL | 1033478 C1 | 9/2008 | |
| WO | WO-2009/031172 A1 | 3/2009 | |
| WO | WO-2010/105651 A1 | 9/2010 | |

OTHER PUBLICATIONS

Written Opinion of the International Searching Authority PCT/ISA/237 for International Application No. PCT/IT2013/000124 Dated Nov. 27, 2013.

\* cited by examiner

USER MODULES AND METHODS FOR CONNECTING EXTERNAL COMMUNICATION NETWORKS

CROSS-REFERENCE TO RELATED APPLICATION(S)

This application is a national stage entry from International Application No. PCT/IT2013/000124, filed on Apr. 24, 2013, in the Receiving Office of the Italian Patent and Trademark Office") and published on Oct. 30, 2014, as International Publication No. WO 2014/174539 A1 (with corrected version International Publication No. WO 2014/174539 A8), the entire contents of which are incorporated herein by reference.

BACKGROUND OF THE INVENTION

The present invention relates to the field of communications and, more particularly, to a user module, a modular system and a method for connecting an external fibre optics communication network for telephony, data and/or video to a user network of a building including fibre optic cabling.

In the present description and in the following claims, the term "external communication network" is used to indicate a complex of fibre optic cables and devices, of passive type (PON—Passive Optical Network), of active node type or of mixed passive and active node type, forming an architecture capable of connecting one or more telecommunication exchange cabinets to several buildings.

In the present description and in the following claims, the term "user network of a building", is used to indicate a complex of fibre optic cables and devices forming an architecture extending in a building and capable of connecting several users to a distribution apparatus connected in turn to the external communication network.

RELATED ART

Within the field of modern communication systems and together with the rapid growth of the so-called broadband services provided by one or more operators of an external communication network, a progressive implementation is underway of fibre optic cablings which allow to effectively transport the quantity of data necessary for such services (for example, a telephone, data and/or video service) to the final user.

In the widespread cabling action, known in the art with the acronym of FTTH (Fibre To the Home) and together with the growth of the number of operators capable of offering the aforementioned broadband services and which share the same external communication network, the need has arisen to allow various operators to connect their own network to one or more users of buildings with several dwelling units (known in the art with the acronym of MDU—Multi Dwelling Unit) provided with their own internal fibre optic network or user network.

All this should occur not only at the time of making the user network of the building and/or at the time of the first connection of a user with the external communication network by means of a given service provider, but also in subsequent times, allowing in particular a different operator to replace the preceding operator in providing telephone, data or video services.

In order to satisfy this need, a distribution box is generally used which is typically installed in the basement of the building and which is internally provided with at least one user board by means of which a connection between the fibres of a connection cable of the user network associated to each user and the fibres of a connection cable to the external communication network is established and provided with an operator board from which the fibres of the aforementioned connection cable branch out to the external network.

Such distribution boxes, however, have the drawback of making difficult the connection of different operators to different users of the same building, in particular when an operator is taken over by a different operator in the supply of services to a user. The various operators, in fact, are nowadays necessarily compelled to interfere with the connections previously made by other operators within the same distribution box, in order to gain access to the user board.

In order to improve the connection operations of a number of service operators who share an external communication network to one or more users of a building with multi dwelling units and provided with its own internal fibre optic network, International patent application no. WO 2009/031172, in the name of the same Applicant, discloses a modular system for connecting an external communication network to a user network of a building is known. Such a modular system comprises at least one user module and at least one operator module.

Each user module comprises at least one passage opening of a connection cable of the user network, the cable comprising a plurality of optical fibres associated to respective users, and a plurality of adapters associated to respective optical fibres of the connection cable of the user network.

Each operator module comprises at least one inlet opening of at least one connection cable to the external communication network, the cable comprising a plurality of optical fibres, and at least one outlet opening of a plurality of fibre optic connection elements connected to the external communication network, the connection elements being provided with a connector at a terminal end thereof.

The external communication network is operatively associated to the user network by means of a connection of the connectors of the fibre optic connection elements with respective selected adapters of said plurality of adapters of the user module. Following the increasing in communication traffic, installers have in many instances to carry out tens of fibre connections between the user modules of the modular system and this results in user modules very densely packed with connectors. It is therefore difficult for installers to access user modules for making connections or repatching the connections once made and this increases the working time.

In a different arrangement, disclosed by EP 1 160 603, a distribution rack for an optical fibre transmission system comprises support members supporting connector support means and optical fibres organizer means. The connector support means are configured to support an array of connectors for connecting optical fibres supported on the support members defining a support plane and the optical fibres organizer means are configured to store an excess length of optical fibre associated with each connector. The connector support means are located on one side of said support members and the optical fibre organizer means are located on the other side of the said support members. The support members are hinged along a vertical pivoting axis and are rotatable about said pivoting axis between two positions in which opposite faces thereof are accessible respectively.

In the EP 1 160 603 arrangement, a rotation of the support members of about 90° about the vertical pivoting axis allows opposite sides of the support members to be accessible by an installer from a given access position. However, during rotation of the support members, the latter remain inside the distribution rack. As a consequence, if the distribution rack is very densely packed with connectors, it is still difficult for installers to access the distribution rack for making connections or repatching connections once made.

SUMMARY OF THE INVENTION

In view of the problems associated with the prior art systems discussed above, the object of the invention is to simplify the access by installers to user modules of a modular system in order to minimize handling difficulties for the installers, accelerate connection, repair or maintenance operations, and achieving at the same time a substantial reduction of costs and required labour.

The Applicant has found that it is convenient to have a vertical patch panel holding fibre connectors where it is mounted in a box-shaped body and can move between a rest position, wherein the patch panel is completely housed within the box-shaped body and a connecting position, wherein the patch panel is at least partially extracted from the box-shaped body.

In view of the above, the present invention relates to a user module for connecting an external communication network to a user network of a building, comprising:
  a box-shaped body;
  a plurality of adapters associable to respective optical fibres units of at least one optical cable of the user network; and
  a patch panel arranged between respective lower and upper walls of said box-shaped body and configured to receive said plurality of adapters, said patch panel defining adjacent compartments within the user module,
wherein the patch panel is housed in said box-shaped body and is movable between a rest position, wherein the patch panel is completely housed within the box-shaped body, and a connecting position, wherein the patch panel is at least partially extracted from the box-shaped body.

Thanks to the aforementioned combination of features and, in particular, thanks to the moving assembly of the patch panel in the box-shaped body of the user module between the rest position and the connecting position, the user module of the invention advantageously allows installers to easily access the user module, namely the patch panel thereof, in order to make connections or repatch connections already made.

In fact, being the patch panel at least partially extractable from the user module, in order to connect one or more operator modules to one or more user modules, for example at the time of making the user network of the building and/or at the time of the first connection of a user with the external communication network by means of a given service provider, but also in subsequent times, installers are not required to handle any element inside the user module to carry out the desired new connection.

Thus, the connecting operations may be carried out in a quick and easy manner, reducing the working time and minimising the handling operations required to the installers both in case of brand new connections or in case of repatching connections already in place.

In a preferred embodiment, the patch panel is housed in said box-shaped body by means of at least one connection assembly comprising an engaging element formed in said patch panel and configured to cooperate with a corresponding guide element formed in said box-shaped body of the user module.

Advantageously, such a connection assembly allows the patch panel to be easily extracted from the user module, in order to make connections or repatch connections already made, and to be inserted back into the user module at the end of the connecting or repatching operations.

In this preferred embodiment, the at least one engaging element preferably comprises a pin projecting from a lower and/or an upper edge of the patch panel, and said guide element preferably comprises at least one aperture formed in the lower and/or upper wall of the box-shaped body of the user module.

In this way, it is advantageously possible to extract ad insert back the patch panel from/into the user module in a simple and practical manner.

Preferably, the pin is substantially elliptical in shape.

Advantageously, the patch panel can be extracted from its rest position with a combined rotational and translational movement so that its overall orientation changes from a first orientation to a second complementary orientation upon extraction. To this end, the at least one aperture is substantially curvilinear.

Preferably, the at least one aperture is substantially rectilinear.

In a preferred embodiment, the patch panel forms in the rest position an angle varying from 10° to 40° with respect to a transversal plane of said at least one user module. In this way, when the patch panel is in its connecting position, i.e. extracted from the user module, both side walls thereof are easily accessible by the installers.

In a preferred embodiment, the patch panel comprises at least one guiding element configured to guide said at least one optical cable of the user network during the movement of the patch panel between the rest position and the connecting position.

In this preferred embodiment, the at least one guiding element preferably comprises a pair of substantially L-shaped superimposed arms projecting from a side wall of the patch panel, said arms defining therebetween a gap configured to guide the optical fibre units of the optical cable of the user network.

In this way, it is advantageously possible to allow the optical fibre units of the optical cable of the user network to follow in a safe way, i.e. without undergoing traction stresses, the patch panel when it moves between its rest and connecting positions.

In a preferred embodiment, the at least one user module comprises at least one dovetail joint.

In this preferred embodiment, the at least one dovetail joint preferably comprises at least one wedge-shaped protrusion projecting from an upper and/or lower edge of the patch panel at an outer end portion thereof and a mating undercut formed at an outer end portion of said lower and/or upper wall of said box-shaped body of the user module.

In this way, a lateral movement of the patch panel and/or a bending movement of a lower and/or upper wall of the box-shaped body of the user module are advantageously prevented. This advantageously results in an increased strength of the box-shaped body of the user module when the patch panel is in its rest position.

In a preferred embodiment, the patch panel further comprises at least one coupling opening formed at a rear edge thereof and configured to snap engage with a corresponding tongue projecting from a rear wall of the box-shaped box of the user module.

In this way, the patch panel is advantageously firmly blocked in position within the used module, when in the rest position thereof.

In a preferred embodiment, the patch panel further comprises an aperture forming a passage between said adjacent compartments defined by the patch panel within the user module. Preferably, the aperture is in the form of a transversal slot.

In this way, it is advantageously possible to connect fibre optic connection element associated to the operator module to the respective optical fibre units of the user module when both the fibre optic connection element associated to the operator module and the optical fibre units of the user module enter the user module from the same compartment delimited by the patch panel.

In this preferred embodiment, the patch panel preferably comprises a pair of retention arms perpendicularly projecting from a side wall thereof at the aperture. More preferably, each retention arm comprises a rounded free end.

In this way, the fibre optic connection element is advantageously smoothly guided between the retention arms and exits from the retention arms without undergoing any sharp bending.

Preferably, each retention arm comprises at least one stiffening bracket.

In a preferred embodiment, the patch panel comprises a plurality of openings each configured to receive a respective adapter of said plurality of adapters, each free opening of said plurality of openings being provided with a frangible tongue.

In this preferred embodiment, the frangible tongue of each free opening of said plurality of openings is preferably provided with an identification sign so as to facilitate the aforementioned operations of the operator in case of installation/maintenance.

According to a further aspect thereof, the invention relates to a method for connecting an external communication network to a user network of a building, comprising the steps of:

a) providing at least one box-shaped body housing a patch panel, said patch panel being arranged between respective lower and upper walls of the box-shaped body;
b) moving the patch panel from a rest position, wherein it is completely housed within the box-shaped body to a connecting position, wherein it is at least partially extracted from the box-shaped body;
c) connecting optical fibre units of at least one optical cable of the external communication network to optical fibre units of an optical cable of the user network through respective adapters received in the patch panel after that said patch panel is at least partially extracted from the box-shaped body.

Thanks to the aforementioned combination of features and, in particular, thanks to the movement of the patch panel in the box-shaped body of the user module between the rest position and the connecting position, the connecting method of the invention achieves the outstanding advantageous technical effects outlined hereinabove and, more specifically, allows to carry out the connecting operations in a quick and easy manner, reducing the working time and minimising the handling operations required to the installers both in case of brand new connections or in case of repatching connections already in place.

Preferably, the box-shaped body is the box-shaped body of a user module and the method comprises the further steps of:

providing at least one operator module comprising at least one inlet opening of the at least one optical cable of the external communication network;
associating said at least one optical cable of the external communication network to said at least one operator module; and
associating a plurality of fibre optic connection elements connected to the external communication network and provided with a connector at a terminal end thereof to said at least one operator module.

Preferably, step c) of connecting optical fibre units of at least one optical cable of the external communication network to optical fibre units of an optical cable of the user network through respective adapters received in the patch panel comprises placing the fibre optic connection elements coming out from the operator module in a patching channel defined within said at least one user module and said at least one operator module.

In another aspect, the present invention relates to a modular system for connecting an external communication network to a user network of a building, comprising:

at least one user module comprising a box-shaped body housing:
  at least one optical cable of the user network, said cable comprising a plurality of optical fibre units associated to respective users;
  a plurality of adapters associated to respective optical fibre units of said at least one optical cable of the user network;
  a patch panel arranged between respective lower and upper walls of said box-shaped body and configured to receive said plurality of adapters, said patch panel defining adjacent compartments within the user module;
at least one operator module comprising a box-shaped body housing:
  at least one optical cable of the external communication network, said at least one optical cable comprising a plurality of optical fibre units;
wherein said external communication network is connected to the user network by connecting the optical fibre units of the at least one optical cable of the external communication network to corresponding optical fibre units of the optical cable of the user network through respective adapters of the user module;
which modular system is characterized in that said optical fibre units of said optical cable of the external communication network are connected to the optical fibre units of the optical cable of the user network after that said patch panel is at least partially extracted from said box-shaped body.

Preferably, the patch panel is mounted in the box-shaped body of the user module between a rest position, wherein the patch panel is completely housed within the box-shaped body and a connecting position, wherein the patch panel is at least partially extracted from the box-shaped body.

Additional features and advantages of the invention will become more clearly apparent from the detailed description of preferred, but not exclusive, embodiments of a modular system and of a user module, in accordance with the present invention.

BRIEF DESCRIPTION OF THE DRAWINGS

Such a description will be made hereinafter with reference to the accompanying drawings, given by way of indication and not of limitation, wherein.

DETAILED DESCRIPTION OF THE CURRENTLY PREFERRED EMBODIMENTS

Figure 1:
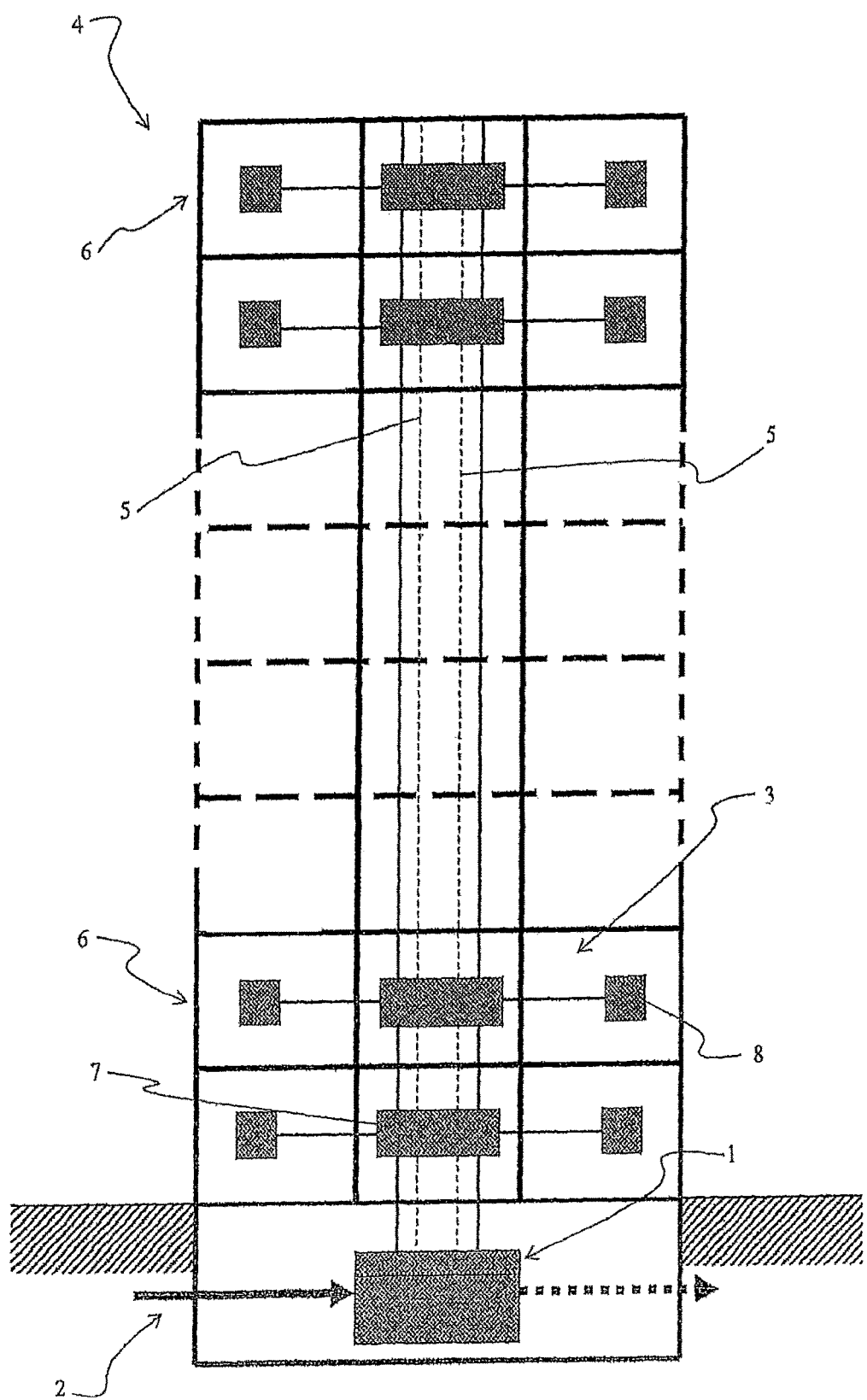
FIG. 1 schematically shows an example of a layout of a user network of a building operatively associated to an external communication network by means of a modular connection system according to the present invention.

With reference to FIG. 1, a modular connection system according to a preferred embodiment of the present invention is generally indicated at 1. The modular connection system 1 is able to connect an external communication network, schematically indicated at 2, to a user network 3 of a building 4.

Preferably, the external communication network 2 is a network shared by a number of service operator, for example of voice, data and video services.

In the example illustrated in FIG. 1, an optical cable 5 that will be termed herein after "riser cable", exits the modular connection system 1 and runs through the building from the basement up to all the building floors.

At each floor of the building, the riser cable 5 may be optically connected to one or more optical cables that will be termed herein after "drop cables". Each drop cable is typically terminated at its far end by a respective customer riser boxes 7 located within or in proximity of the apartment or office of an end user.

For the purposes of the present description and claims an optical cable is deemed to be any optical cable comprising one or more optical fibre units.

A fibre unit can be defined as an assembly comprising a one (or more) optical fibre(s) which is constituted by a glass core, a glass cladding, a single or dual coating layer and an outer layer surrounding the said one (or more) optical fibre(s) in order to protect the overall optical fibre(s) from damage.

The plurality of riser boxes 7 can be located at each floor of the building 4, or in specific positions between several floors, for connecting the riser cables 5 (or at least one optical fibre unit of the riser cables 5) to a user termination box schematically indicated at 8 in FIG. 1.

In the user network 3, the optical fibre units of the riser cables 5 entering into the riser boxes 7 are preferably connected to the termination boxes 8, for example by splicing such optical fibre units to a pigtail which is connected to the termination box 8 or by splicing such optical fibre units to a first pigtail, by mechanically splicing the free end of this first pigtail to an end of a second pigtail which is then connected to the termination box 8.

Figure 2:
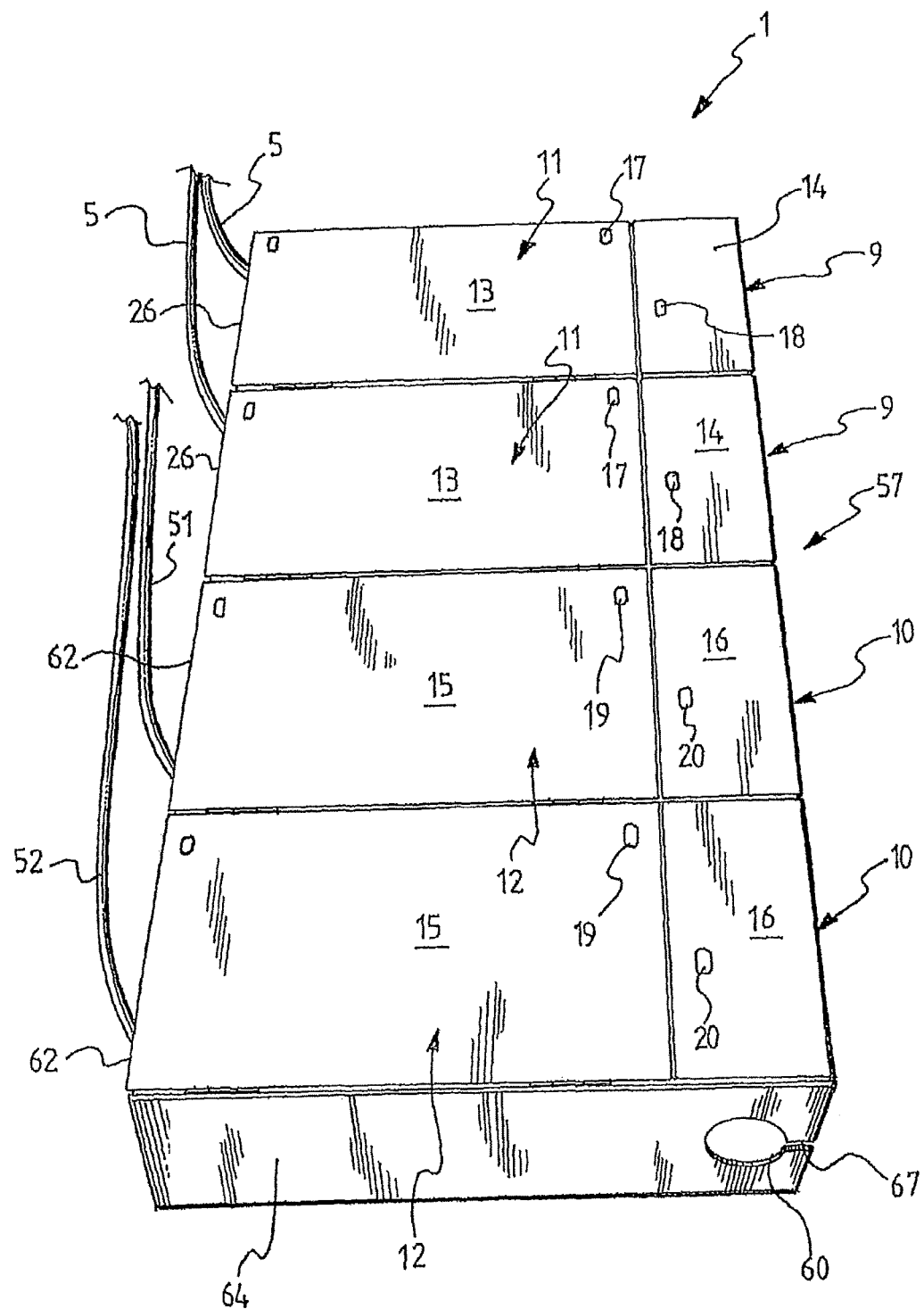
FIG. 2 shows a bottom perspective view of a preferred embodiment of the modular connection system according to the present invention comprising a plurality of user modules and a plurality of operator modules mounted on top of each other.

The modular connection system 1 according to the embodiment illustrated in FIG. 2 preferably comprises a pair of user modules 9 and a pair of operator modules 10 which are structurally independent from each other.

Preferably, the user modules 9 are structurally identical to each other so as to achieve a modular connection system in which various user modules 9 can be interchangeably used and positioned in the most suitable manner according to the connection requirements which one wishes to satisfy.

In a similar manner, also the operator modules 10 are preferably structurally identical to each other, so as to attain the same advantageous technical effects.

In this preferred embodiment, the user modules 9 are connected to the user network 3 of the building 4 and each of them allows to carry out the connection with a predetermined number of users, for example twenty-four users, while the operator modules 10 are connected to the external communication network 2 and each of them belongs to a service operator connected to the user network 3 by means of the modular connection system 1.

Preferably, the user modules 9 and the operator modules 10 are structurally independent from each other.

Preferably, the user modules 9 and the operator modules 10 are mounted on top of each other at respective facing walls thereof, for example their upper and lower walls.

Preferably, the user modules 9 and the operator modules 10 are in particular mounted on a supporting wall of the building 4 or on a substantially flat supporting panel (not shown), so as to attain a substantially vertical configuration which facilitates the installation operations of the modular system 1.

As illustrated in the example of FIG. 2, each of the user modules 9 and each of the operator modules 10 preferably comprises a box-shaped body, respectively indicated with the references 11 and 12, provided in turn with a pair of closure doors 13 and 14 and, respectively 15, 16.

The closure doors 13, 14 and 15, 16 are preferably hinged to the box-shaped bodies 11, 12 of the user modules 9 and of the operator modules 10 so as to close respective compartments of the modules, which shall be described hereinbelow.

Figure 3:
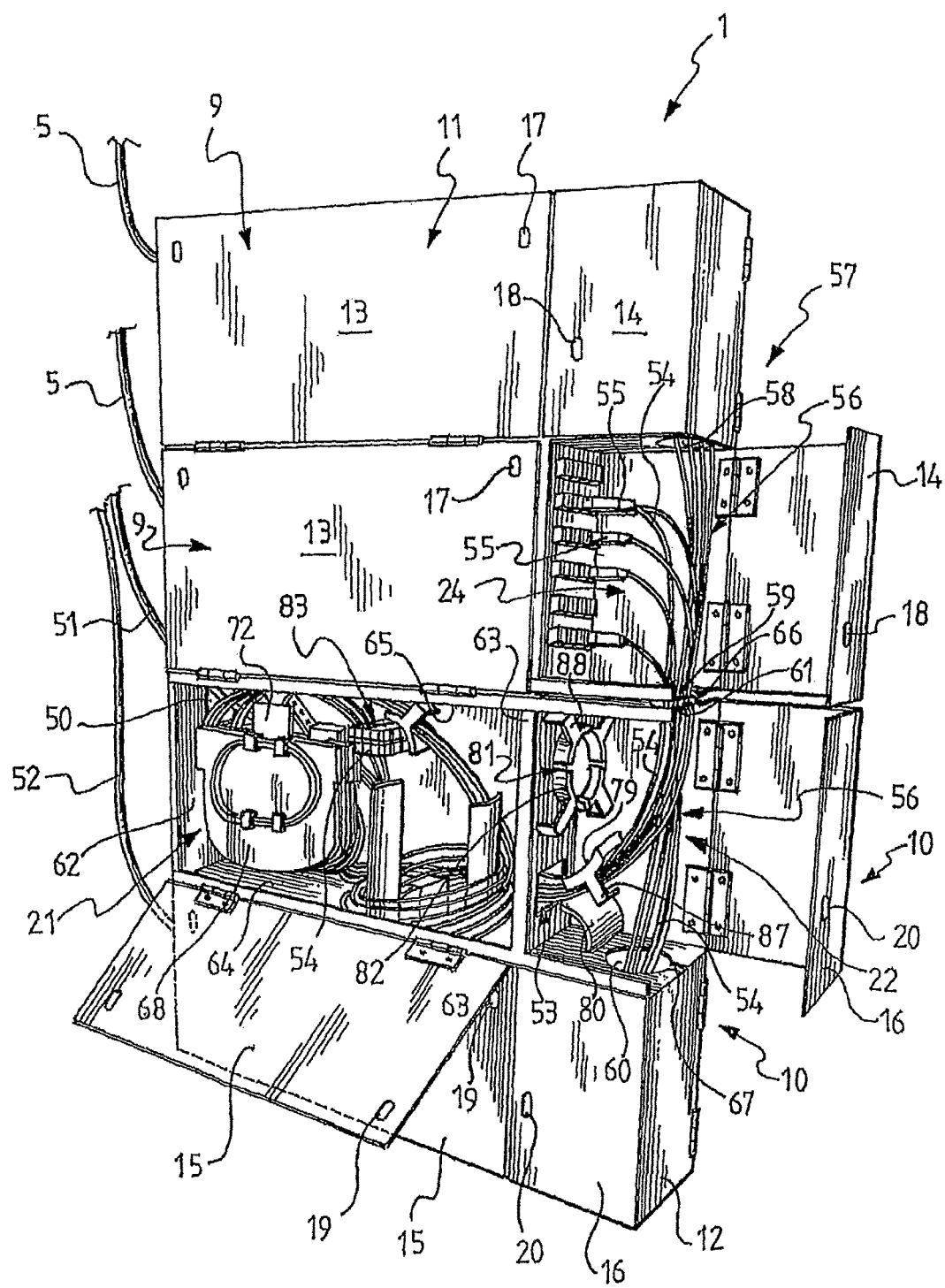
FIG. 3 shows a perspective view of the modular connection system of FIG. 2 with the doors of an operator module and a door of a user module in open position.

In FIG. 3, the doors 15 and 16 of the upper operator module 10 and the door 14 of the lower user module 9 are illustrated in open position.

In a preferred embodiment, the closure doors 13, 14, and 15, 16 can be provided with a closure device or with a lock 17, 18 and, respectively, 19, 20 so as to allow a privileged or shared access to the compartments closed by said doors and to the components of the modular connection system 1 housed therein.

Thus, for example, the operator module 10 can be provided with adjacent compartments, namely a compartment 21 of proprietary type, closed by the door 15, which may only be accessed by the operator that owns such a module, and a compartment 22 of shared type, closed by the door 16, which may be accessed by all the operators who provide services to the users of the building 4.

The user modules 9, on the other hand, can be provided with adjacent compartments 23, 24, both of shared type, which may be accessed by all the operators which provide services to the users of the building 4 for the connection and/or maintenance operations.

In the preferred embodiment illustrated, the modular system 1 further comprises a patching channel 56 adapted to receive fibre optic connection elements 54 of a plurality of connection elements coming out from the operator modules 10 and substantially extending within the user modules 9 and the operator modules 10.

In this way, the user modules 9 and the operator modules 10 form a modular assembly 57 in which the patching channel 56 constitutes an element capable to operatively associate with each other the modules 9, 10 of the modular system 1, housing within its inner space and at the same time protecting the fibre optic connection elements 54 coming out from the operator modules 10.

In the illustrated embodiment, the patching channel 56 extends within the superimposed compartments 22 and 24 of the operator modules 10 and of the user modules 9.

This preferred configuration of the patching channel 56 can be attained thanks to a preferred structure of the user modules 9 which provides for the presence of a pair of substantially coaxial openings 58, 59 formed in lower and upper walls of the modules 9 at an end portion of the respective box-shaped bodies 11 and to a preferred structure of the operator modules 10 which provides for the presence of a pair of substantially coaxial openings 60, 61 formed in lower and upper walls of the modules 10 at an end portion of the respective box-shaped bodies 12.

In this way, the patching channel 56 is preferably defined within the compartments 22 and 24 of the modules 9 and 10 by the substantially coaxial openings 58, 59 and 60, 61 so that the channel is preferably completely enclosed within the modular system 1, thereby attaining an effective protection of the fibre optic connection elements 54.

In this way, it is advantageously possible to define the patching channel 56 in a simple and practical manner, in particular when the modules 9, 10 are mounted on top of and adjacent to each other.

Both the upper and lower operator modules 10 of the connection system 1 preferably comprise an inlet opening 50 of respective riser cables 51, 52 to the external communication network 2 and owned for example by two different service operators.

The opening 50 is preferably formed in the box-shaped body 12 of the operator modules 10 at an upper end of a lateral wall 62 of the body 12 opposite to the compartment 22.

Preferably, each of the riser cables 51, 52 comprises a plurality of optical fibre units.

Preferably, the operator modules 10 further comprise an outlet opening 53 from the compartment 21 of the plurality of fibre optic connection elements 54 connected to the external communication network 2 and provided with a connector 55 at one terminal end thereof.

Such opening 53 is preferably formed in a separating wall 63 arranged between respective lower 64 and upper 65 walls of the box-shaped body 12 of the operator modules 10.

According to the invention and as will be better apparent hereinbelow, the external communication network 2 is operatively associated to the user network 3 by means of the connection of the connectors 55 of the fibre optic connection elements 54 with respective selective adapters of the user modules 9.

In this preferred embodiment of the operator modules 10, furthermore, the substantially coaxial openings 60, 61 formed in the lower 64 and upper 65 walls of the modules 10 constitute as many outlet openings of the fibre optic connection elements 54 from the operator modules 10.

Figure 4:
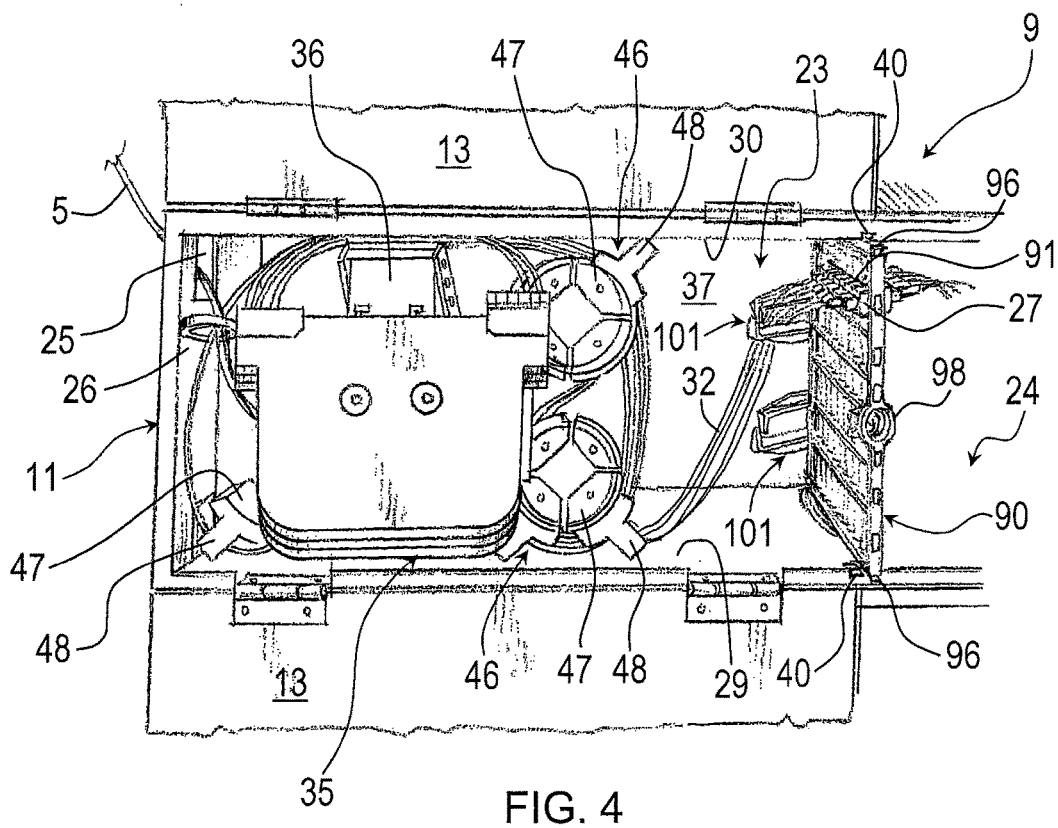
FIG. 4 shows a perspective view in an enlarged scale of a portion of a user module of the modular connection system of FIG. 2, with the patch panel in the rest position.
Figure 5:
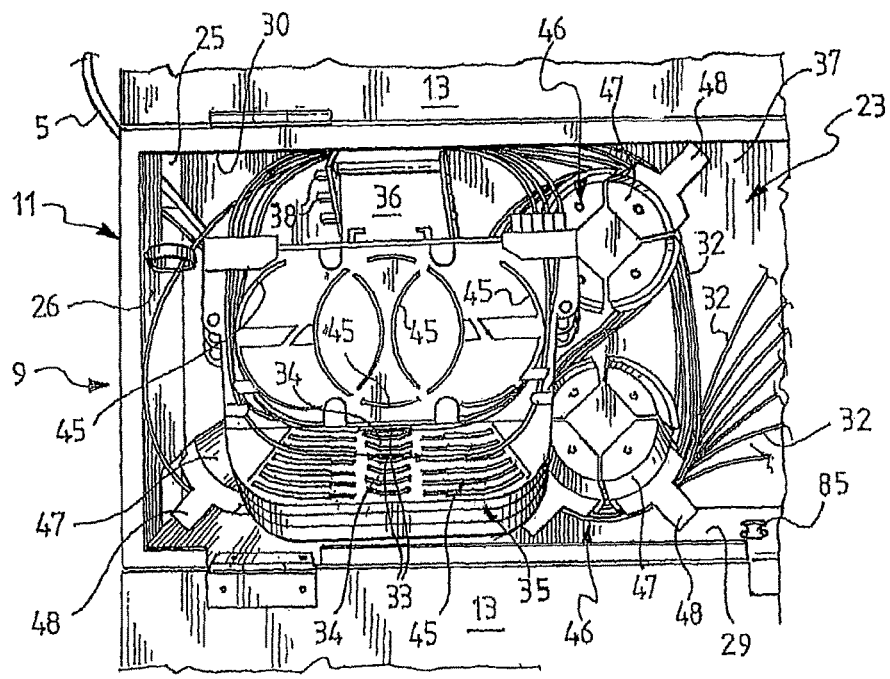
FIG. 5 shows a front view in an enlarged scale of some details of the user module of FIG. 4.

With reference to FIGS. 4 and 5, each user module 9 preferably comprises at least one passage opening 25 of the riser cables 5 of the user network 3 preferably formed in the box-shaped body 11 at an upper end of the lateral wall 26 of said body 11 opposite to the compartment 24, and a plurality of adapters 27 associated to respective optical fibre units of the riser cables 5 of the user network 3.

Preferably, the adapters 27 are mounted in a plurality of adjacent vertical arrays in a patch panel 90 delimiting the adjacent compartments 23 and 24 of the box-shaped body 11 of the user module 9. Such a patch panel 90 will be described in greater detail in the following of the present specification.

In the preferred embodiment illustrated, the adapters 27 of the user module 9 are associated to the respective optical fibre units of the riser cables 5 of the user network 3 by means of a plurality of pigtails 32.

Advantageously, the use of the pigtails 32 allows to equip the user network 3 with a plurality of separation points which allow to split the user network 3 into a plurality of separate sectors, independent from each other, facilitating the handling of the user network 3, for example in case of failure.

Preferably, the pigtails 32 are associated to the optical fibre units of the riser cables 5 of the user network 3 by splicing the fibres by means of butt splicing according to techniques known to those skilled in the art.

The splices 33 formed in this way are preferably housed in respective housing seats 34 formed in a plurality of support trays 35, preferably stacked on each other, so as to increase the overall number of users which may be connected by means of a single user module 9 (see FIG. 5).

In this way, it is advantageously possible to adequately protect the splices 33 between the optical fibre units of the riser cables 5 of the user network 3 and the pigtails 32.

Preferably, the trays 35 are provided within their inner space with a plurality of guide elements for the optical fibre units, all indicated at 45, shaped such that the optical fibre units of the riser cable 5 of the user network 3 and the pigtails 32 housed in the user modules 9 cannot undergo direction changes with curvature radii greater than a predetermined minimum value, both in static conditions and in traction conditions induced by handling of the optical fibre units.

Thus, the best protection of the optical fibre units is ensured against possible bending during the installation and maintenance steps.

To this end, the guide elements 45 (or at least some of them) preferably comprise shaped guide fins perpendicularly projecting from the rear wall of the trays 35 and having a curvature radius greater than the predetermined minimum value. Preferably, such shaped fins are also arranged such that every fin starts and ends in a direction substantially tangent to the adjacent fins (or to the inlet opening of the fibres into the tray). The minimum curvature radius is thus ensured, even in the case of traction of the optical fibre units.

Preferably, the predetermined minimum value of the curvature radius is not less than 30 mm; such value being normally tolerated by the optical fibre units.

Preferably, the support trays 35 are rotatably mounted in the user module 9 so as to facilitate the operations of the operator on the underlying structures, such as for example the insertion in the module of the fibres extracted from the riser cable 5 of the user network 3 or of the pigtails 32, as well as the insertion of the splices 33 in an underlying tray 35.

To this end, the trays 35 are hinged to a supporting element 36 fixed to one of the walls of the box-shaped body 11 of the user modules 9, for example to the rear wall 37. In an alternative embodiment, the supporting element 36 can be fixed to the inner side of the closure panel 13 of the compartment 23 of the user module 9.

Preferably, the supporting element 36 has a substantially U-shaped body bevelled at a free end, so as to allow both to hinge the trays 35 and to stack the same without having interferences.

More particularly, the trays 35 are hinged to the supporting element 36 by means of a plurality of pins 38 fixed to opposite flaps of the substantially U-shaped body of the supporting element 36, which flaps constitute in this case as many supporting arms of the trays 35 associated to the box-shaped body 11 of the user modules 9.

In the preferred embodiment illustrated, the user modules 9 further comprise a plurality of winding elements, all indicated at 46, for the optical fibre units of the riser cable 5 of the user network 3 and for the pigtails 32 located outside the trays 35.

In an entirely similar manner to the guide elements 45 of the trays 35, the winding elements 46 are preferably shaped such that the optical fibre units of the riser cables 5 of the user network 3 and the pigtails 32 housed in the compartment 23 of the user modules 9 cannot undergo direction changes with curvature radii greater than the aforementioned predetermined minimum value of 30 mm, both in static conditions and in traction conditions induced by handling the optical fibre units.

To this end, the winding elements 46 preferably comprise shaped fins 47 perpendicularly projecting from the rear wall 37 of the box-shaped body 11 of the user modules 9 and having a curvature radius greater than the predetermined minimum value. Preferably, the shaped fins 47 are also arranged such that every fin starts and ends in a direction substantially tangent to the adjacent fins 47 (or to the passage opening 25 of the connection cables 5 of the user network 3 in the modules 9). The minimum curvature radius is thus assured even in case of traction of the optical fibre units.

Preferably, the shaped guide fins 47 can comprise retention portions 48 perpendicularly projecting from the fins 47, parallel to and spaced from the rear wall 37 of the box-shaped body 11 of the user modules 9. The retention portions 48 exert the advantageous function of ensuring that the optical fibre portions are effectively maintained in position about the winding elements 46.

Figure 6:
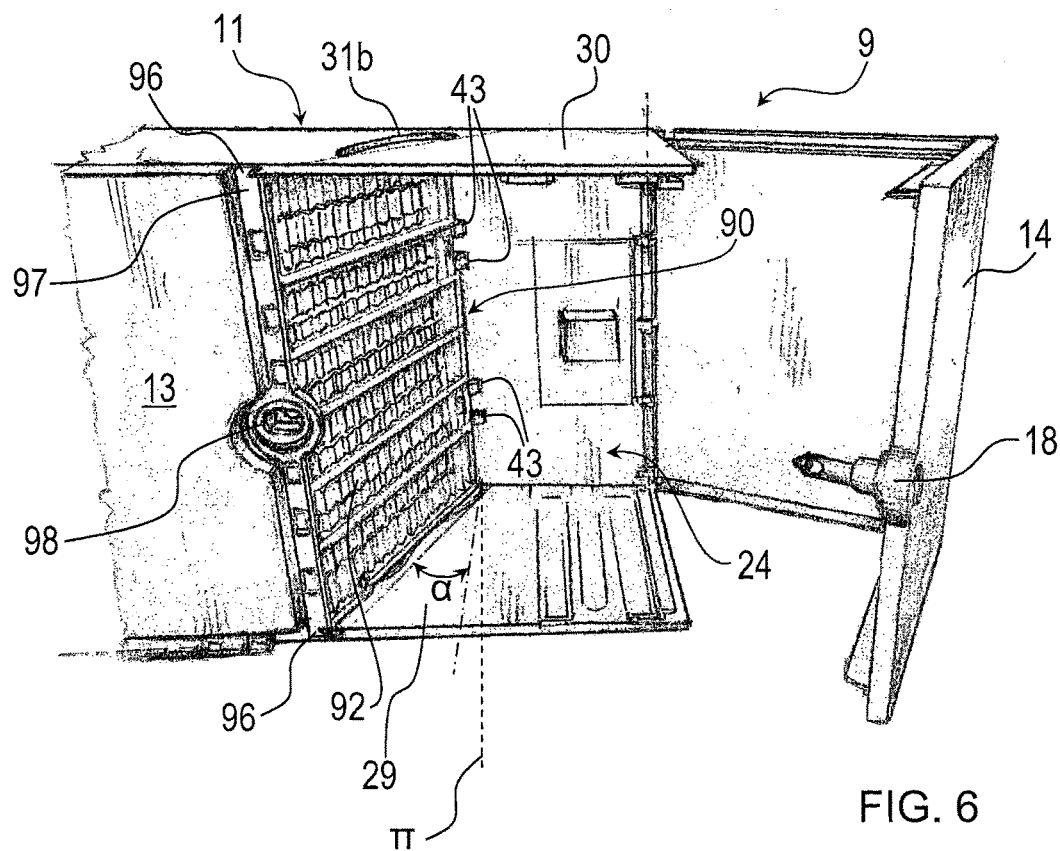
FIG. 6 shows a perspective view in an enlarged scale of another portion of a user module according to the invention with the patch panel in the rest position.
Figure 7:
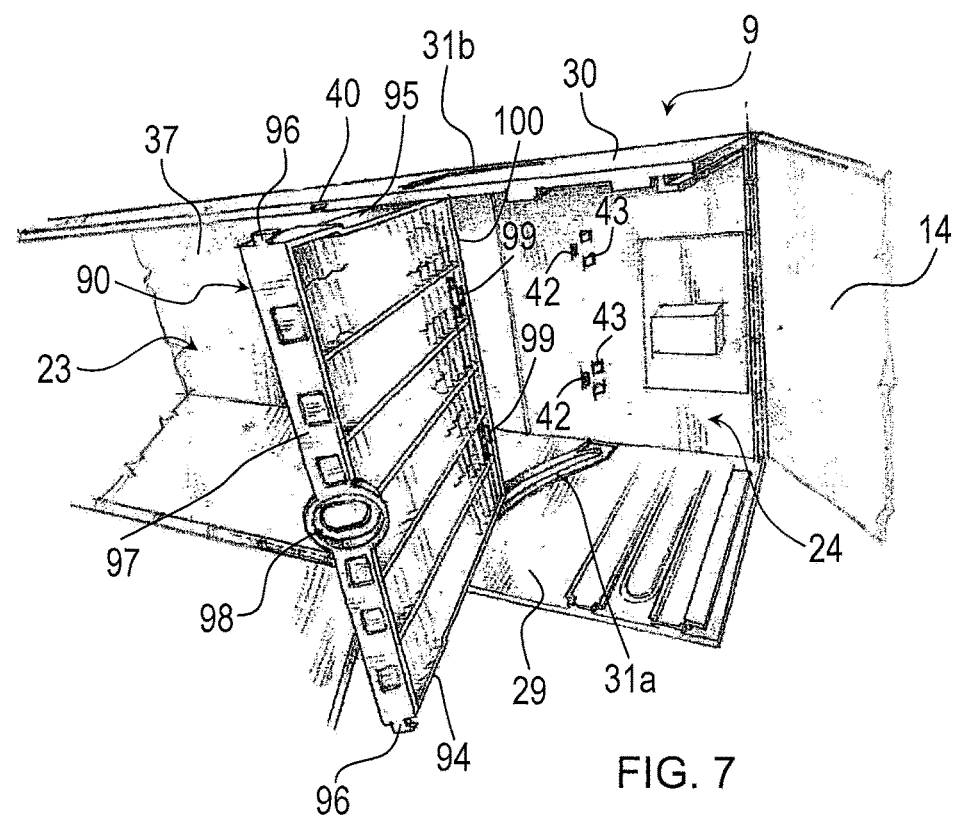
FIG. 7 shows a view similar to that of FIG. 6 with the patch panel in the connecting position.
Figure 8:
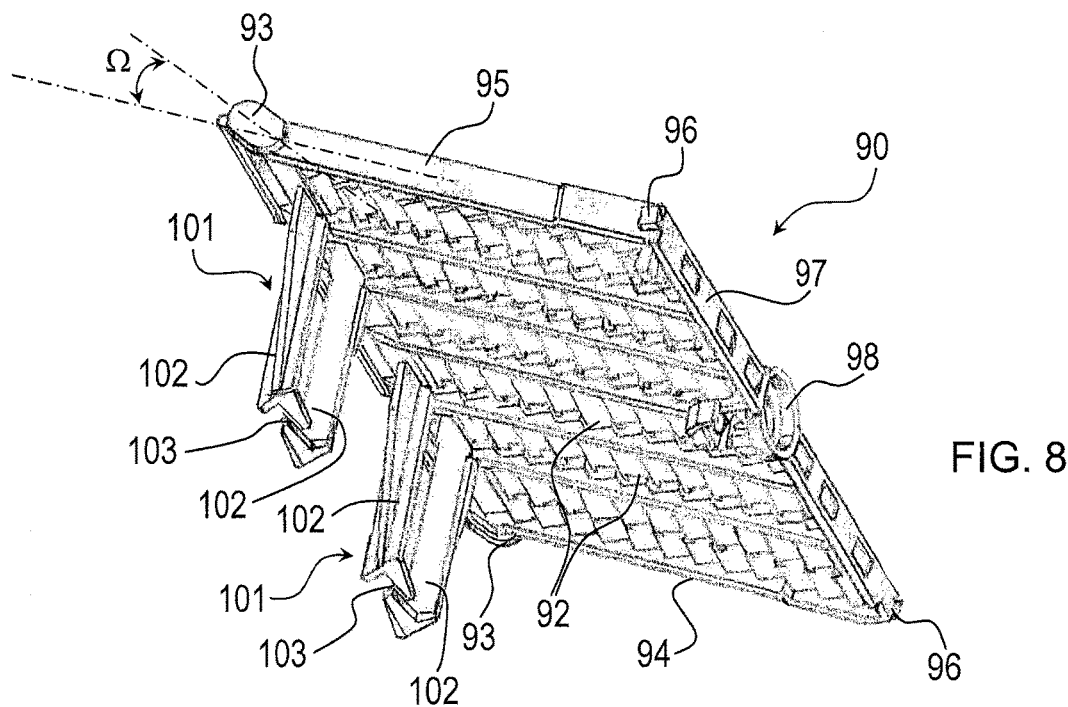
FIG. 8 shows a perspective view in an enlarged scale of a patch panel of a user module according to an embodiment of the invention.

With reference to FIGS. 6 to 8, the patch panel 90 of the user module is described in greater detail.

The patch panel 90 is arranged between respective lower 29 and upper 30 walls of the box-shaped body 11 of the user module 9, thereby delimiting the two adjacent compartments 23 and 24.

Preferably, the lower 29 and upper 30 walls are detachable from the box-shaped body 11 in order to give the compartments 23 and 24 even more easily accessible by the installers.

The patch panel 90 is provided with a plurality of openings 91, each being configured to receive a respective adapter 27 associated to respective optical fibre units of the riser cables 5 (see FIG. 4). The openings 91 are for example square openings, adjacent to each other. It will be evident to a person skilled in the art that other shapes of the openings 91, such as a round or elliptical one, may be feasible depending on the circumstances.

In the following description and in the following claims, the expression "free opening" refers to an opening 91 which has not yet received the respective adapters 27. Preferably, each free opening 91 is closed by a respective frangible tongue 92, which is configured to be broken when the adapter 27 is inserted into the respective free opening 91 of the patch panel 90. Preferably, each frangible tongue 92 is provided with a respective identification sign (not shown in the drawings), for example a number, a letter and the like.

Preferably, the identification signs are moulded or printed on the respective frangible tongue 92. The identification sign, advantageously facilitate the connection or repatching operation by the installers.

The patch panel 90 is assembled in the box-shaped body 11 between a rest position (shown in FIG. 6), wherein the patch panel 90 is completely housed within the user module 9, and a connecting position (shown in FIG. 7), wherein the patch panel 90 is at least partially extracted from the user module 9.

To this end, the patch panel 90 preferably comprises at least one connection assembly comprising an engaging element configured to cooperate with a corresponding guide element formed in the box-shaped body.

The patch panel 90 comprises at least a pin 93 projecting from a lower 94 or an upper edge 95 of the patch panel 90.

In the preferred embodiment illustrated, the patch panel 90 comprises a pair of connection assemblies, each comprising a pin 93 projecting respectively from a lower 94 and an upper edge 95 of the patch panel 90.

Each pin 93 is preferably configured to cooperate with the corresponding guide element formed in the box-shaped body. The guide elements comprise a corresponding aperture or slot 31a, 31b formed in the lower 29 and/or upper wall 30 of the box-shaped body 11 of the user module 9.

The lower wall 29 of the box-shaped body 11 comprises at least one lower aperture 31a for cooperating with the at least one pin 93 projecting from the lower edge 94 of the patch panel 90.

Similarly, the upper wall 30 of the box-shaped body 11 comprises at least one upper aperture 31b for cooperating with the at least one pin 93 projecting from the upper edge 95 of the patch panel 90.

Preferably, each aperture 31a,31b has a substantially curvilinear shape.

Preferably, the pins 93 are substantially elliptical in shape. It is understood that the pins 93 can be of any shape suitable for smoothly moving in the corresponding aperture 31.

Figure 10:
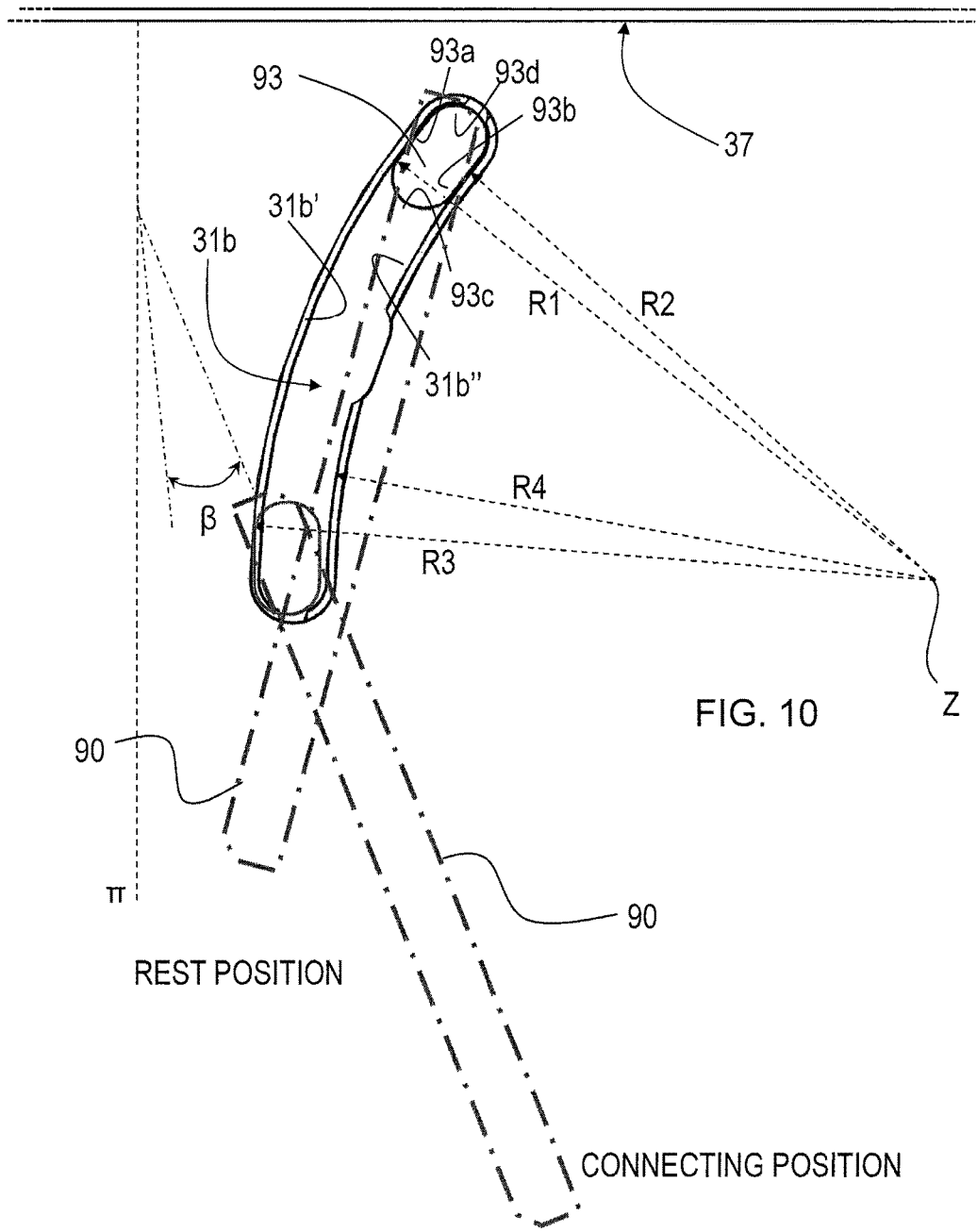
FIG. 10 shows an upper view of a guide element of the patch panel according to present invention.

As illustrated in the example of FIG. 10, the aperture 31b has an overall internal edge comprising two substantially semi-circular internal edges each joined by a first 31b' and a second lateral internal edges 31b".

Preferably, the first lateral internal edges 31b' is curved around a radius R3 and the second lateral internal edges 31b" is curved around a radius R4.

As illustrated in the example of FIG. 10, each pins 93 has an external edge comprising two substantially semi-circular edges 93c, 93d each joined by a first 93a and a second lateral edges 93b.

Preferably, the first lateral edge 93a is curved around a radius R1 and the second lateral edge 93b is curved around a radius R2.

In order change the orientation of the patch panel 90 from the rest position to the connecting position, the length of the radius of curvature R1 of the first lateral edge 93a of the pin 93 is substantially the same of the length of the radius of curvature R3 of the first lateral internal edges 31b' of the aperture 31b. Similarly, the length of the radius of curvature R2 of the second lateral edge 93b is substantially the same length of the radius of curvature R4 of the second lateral internal edges 31b''.

Due to the configuration of the pins 93 and the apertures 31a, 31b, the patch panel 90 is configured to rotate and translate during its movement from the rest position to the connecting position and vice versa.

According to a further preferred embodiment of the invention, the patch panel 90 can be at least partially extracted from the user module 9 according to a translation movement between the rest position and the connecting position. In this latter case, the apertures 31a, 31b housing the pins 93 are preferably substantially rectilinear.

As illustrated in the example of FIG. 8, preferably, the overall orientation of each pins 93 is slightly staggered with respect to the orientation of the patch panel 90. In particular, the orientation of each pins 93 is staggered by an angle Ω varying from 10° to 40°, preferably an angle Ω of 20°, with respect to the patch panel 90.

Advantageously, being the patch panel 90 at least partially extracted from the user module 9, when in its connecting position, installers can easily make connections or repatch connections already made, without the need to handle any element within the user module 9. This advantageously reduces the working time and at the same time minimizes and simplifies the connecting or repatching operations.

Preferably, the patch panel 90 is assembled within the box-shaped body 11 of the user module 9 thereby forming in the rest position an angle α varying from 10° to 40°, preferably an angle α of 20°, with respect to a transversal plane π of the user module 9.

Preferably, the patch panel 90 is assembled within the box-shaped body 11 of the user module 9 thereby forming in the connecting position an angle β (see FIG. 10) varying from 10° to 40°, preferably an angle β of 20°, with respect to the transversal plane π of the user module 9.

In the present description and in the following claims, the term "transversal plane of the user module 9" is used to indicate a plane π perpendicular to the rear wall 37 of the user modules 9.

Advantageously, this inclined arrangement of the patch panel 90 within the user module 9, facilitates the connecting and/or repatching operations both of the riser cables 5 of the user network 3 and the pigtails 32 housed in the compartment 23 of the user modules 9 and of the plurality of fibre optic connection elements 54 connected to the external communication network 2 and coming from each operator module 10, in particular when the patch panel 90 is rotates and translates during its extraction from the user module 9.

Once the patch panel 90 is at least partially extracted, in fact, both sides thereof may be easily accessed by the installers.

Preferably, when the patch panel 90 is substantially fully extracted, the side of the patch panel 90 facing the compartment 23 may be more easily accessed by the installers.

Preferably, the patch panel 90 further comprises at least one dovetail joint preferably comprising a wedge-shaped protrusion 96 and a mating undercut 40 formed in the user module 9.

As illustrated in the example of FIG. 10, the patch panel 90 rotates around the axis Z offset of the panel contour. This rotation is equivalent to a rotation and a translation movement of the patch panel 90 form a rest position to a connecting position.

It is noted that it could be possible to reach the solution of the invention by, for example, providing an arm attached to the patch panel where the free end of said arm can rotate around an axis offset the contour of the patch panel. However, this solution would be expensive and mechanically weak with respect to the preferred embodiments here disclosed.

In the preferred embodiment illustrated, the patch panel 90 comprises a pair of wedge-shaped protrusions 96, respectively projecting from an upper and a lower edge 95, 94 of the patch panel 90 at an outer end portion thereof and configured to be housed within corresponding mating undercuts 40 formed at an outer end portion of the lower 29 and upper wall 30 of the box-shaped body 11 of the user module 9, when the patch panel 90 is in its rest position.

Advantageously, when the dovetails 96 are housed within the corresponding mating undercuts 40, a lateral movement of the patch panel 90 and/or a bending movement of the lower 29 and upper wall 30 of the box-shaped body 11 are prevented. This advantageously results in an increased strength of the box-shaped body 11 of the user module 9 when the patch panel 90 is in its rest position.

In the preferred embodiment illustrated, a front opening 98, preferably substantially circular in shape, is formed in the front edge 97 of the patch panel 90.

Preferably, the front opening 98 is configured to house the closure device or lock 18 provided in the closure door 14 of the compartment 24 of the user module 9. The locking and unlocking operations of the closure door 14 by means of the lock 18 and the front opening 98 are known in the art and are not disclosed herein in further detail. Moreover, a similar closure device can also be provided at the closure door 13 of the compartment 23 of the user module 9 and at the closure doors 15 and 16 of the compartments 21 and 22 of each operator module 10.

The patch panel 90 further preferably comprises at least one coupling opening 99, in the preferred embodiment illustrated a pair of suitable spaced coupling openings 99, preferably rectangular, formed in a rear edge 100 of the patch panel 90.

In the rest position of the patch panel 90, the coupling openings 99 snap engage with a corresponding tongue 42, preferably a wedge-shaped tongue 42, projecting from the rear wall 37 of the box-shaped box 11 of the user module 9. Due to the snap engagement between the coupling openings 99 and the corresponding tongue 42, the patch panel 90 results releasably blocked in position within the box-shaped body 11 of the used module, when the patch panel 90 is in its rest position.

Preferably, the rear wall 37 also comprises at least one additional tongue, preferably two additional tongues 43, similar to tongue 42, vertically aligned with each other and suitably spaced from one another and from the tongue 42 thereby forming with the latter a substantially triangular configuration.

When the patch panel 90 is in its rest position, the tongues 43 abut against the side of the patch panel 90 facing the compartment 24 of the user module 9. This arrangement advantageously contributes to firmly keep the patch panel 90 in its rest position within the box-shaped body 11.

With particular reference to FIGS. 4 and 8, the patch panel 90 further preferably comprises at least one guiding element 101, in the preferred embodiment illustrated a pair of guiding elements 101, for the optical fibre units located outside the trays 35.

The guiding element(s) is/are preferably shaped such that the optical fibre units of the riser cable 5 of the user network 3 and the pigtails 32 housed in the compartment 23 of the user module 9 may be guided in a safe way, i.e. without undergoing traction stresses, in the patch panel 90 when it moves between the rest and connecting positions thereof.

To this end, each guiding element 101 preferably comprises a pair of substantially L-shaped superimposed arms 102 perpendicularly projecting from a side of the patch panel 90 facing the compartment 23 of the box-shaped body 11 of the user module 9.

The superimposed arms 102 are preferably arranged in such a way to form therebetween a gap 103 for the optical fibre units of the riser cable 5 of the user network 3 and for the pigtails 32 located outside the trays 35.

As shown in FIG. 4, during the movement of the patch panel 90 between the rest position and the connecting position, the optical fibre units slide within the gap 103 between the arms 102 of the corresponding guiding element 100 without undergoing undesired traction stresses, which could cause the connector associated to each optical fibre unit to disconnect from the respective adapter 27.

Figure 9:
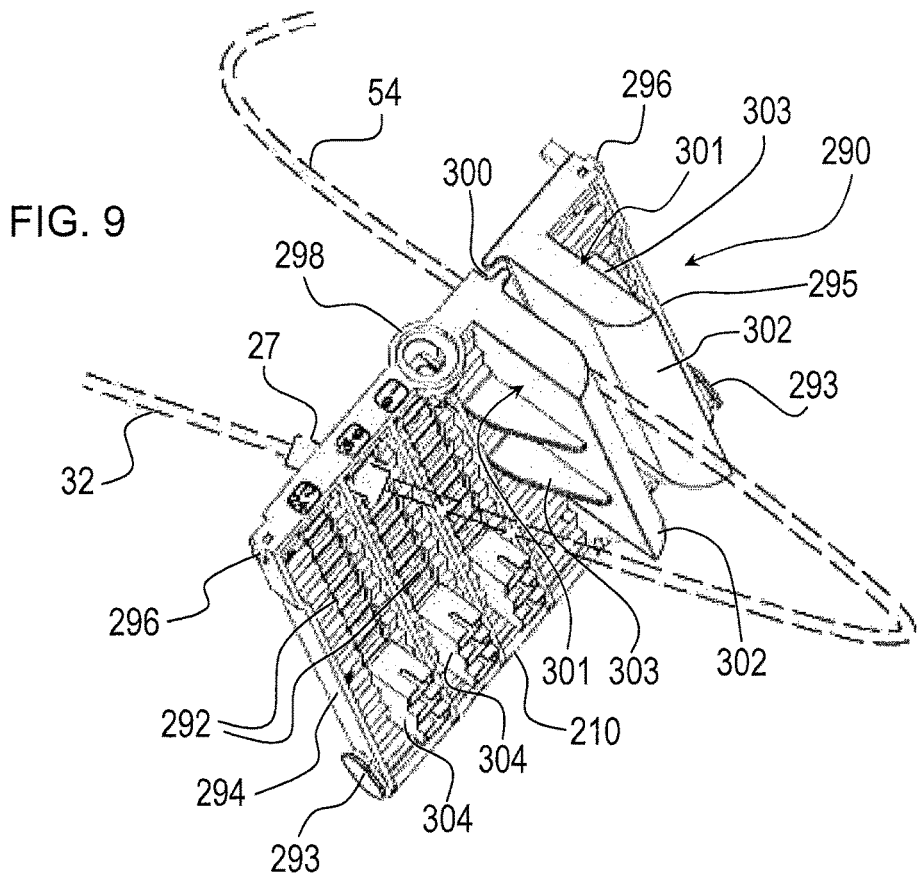
FIG. 9 shows a perspective view in an enlarged scale of a patch panel of a user module according to a further embodiment of the invention.

With reference to FIG. 9, a patch panel 290 according to a further embodiment of the invention will now be illustrated.

Similarly to what has been illustrated above with reference to the patch panel 90, the patch panel 290, comprises a pair of pins 293 projecting respectively from a lower edge 294 and upper edge 295 of the patch panel 290.

The pins 293 are preferably configured to cooperate with corresponding curvilinear aperture 3*a*, 31*b*1 formed in the lower 29 and upper wall 30 of the box-shaped body 11 of the user module 9. Preferably, the pins 293 are substantially elliptical in shape.

Similarly to what has been illustrated above with reference to the patch panel 90, the patch panel 290 is also provided with a plurality of openings, configured to receive a respective adapter 27 associated to corresponding optical fibre units of the riser cables 5.

The openings are preferably closed by a respective frangible tongue 292, preferably provided with a respective identification sign (not shown in the drawings), for example a number, a letter and the like, moulded or printed on the frangible tongue 292.

Similarly to what has been illustrated above with reference to the patch panel 90, furthermore, the patch panel 290 is preferably provided with:
i) a pair of dovetails joints, each comprising a wedge-shaped protrusion 296, projecting from the patch panel 290 and configured to be housed within a corresponding mating undercut 40 formed in the user module 9, when the patch panel 290 is in the rest position thereof; and
ii) coupling openings (not shown in FIG. 9) formed in the rear edge 210 of the patch panel 290 and configured to cooperate with corresponding wedge-shaped tongues 42 and 43 formed in the rear wall 37 of the user module 9 when the patch panel 90 is in the rest position thereof.

Both the dovetail joints and the coupling opening wedge-shaped tongue assemblies cooperate to firmly secure the patch panel 290 within the box-shaped body 11 of the used module 9, when the patch panel 290 is in its rest position, while preventing any undesirable lateral movement of the patch panel 290 and/or a bending movement of the lower 29 and upper wall 30 of the box-shaped body 11.

Similarly to what has been illustrated above with reference to the patch panel 90, the patch panel 290 is provided with a respective front opening 298 configured to house the closure device or lock 18 provided in the closure door 14 of the compartment 24 of the user module 9 and at least one guiding element (not shown in FIG. 9), preferably a pair of guiding elements for the optical fibre units located outside the trays 35 having the shape and function of the guiding elements 101 described above with reference to FIGS. 4 and 8.

The patch panel 290 shown in FIG. 9 differs from the patch panel 90 of FIGS. 4 to 8 in that it further comprises an aperture 300, in the example a transversal slot.

The aperture 300, preferably S-shaped, forming a passage between the adjacent compartments 23 and 24 defined by the patch panel 290 within the user module 9.

At the S-shaped aperture 300, the patch panel 290 further preferably comprises a pair of retention arms 301 perpendicularly projecting from the side wall of the patch panel 290 facing the compartment 24 of the user module 9. Preferably, each retention arm 301 has a rounded free end 302 and, still more preferably, a pair of stiffening brackets 303.

The patch panel 290 of FIG. 8 is particularly advantageous in case both optical fibre units of the riser cable 5 and the fibre optic connection elements 54 enter the user module 9 from the same side.

In fact, as schematically shown in FIG. 9, in order to connect, for example, the fibre optic unit connection element 54 associated to the operator module 10 to a respective adapter 27 of the user module 9, the fibre optic unit connection element 54 advantageously passes through the S-shaped aperture 300 of the patch panel 290 and is subsequently connected to the adapter 27. The retention arms 301 advantageously guide the fibre optic unit connection element 54 along the aperture 300 and the rounded free ends 302 of the retention arms advantageously allow the fibre optic unit connection element 54 to leave the retention arms 301 without undergoing any undesired sharp bending.

The patch panel 290 further preferably comprises respective storage elements 304 for storing any unused fibre optic unit connection elements 54 coming out from the operator modules. In this way, it is advantageously possible to prevent that the fibre optic unit connection elements 54 not connected to the adapters 27 of the user modules 9 may be left loose in the patching channel 56 defined in the modules 9 and 10, with the possibility that the connection elements can get dirty or interfere with the operations of a worker on one of the modules.

More particularly, the patch panel 290 is preferably provided with a plurality of storage elements 304 for storing the connectors 55 of the unused fibre optic unit connection elements 54, which storage elements are constituted by a plurality of adapters not associated to the optical fibre units of the riser cables 5 of the user network 3 or, alternatively, by "dummy" adapters lacking the inner ferrule.

In this case, the connectors 55 of the unused fibre optic unit connection elements 54 are preferably stored in these storage elements 304, avoiding that the fibre optic unit connection elements 54 may be left free to move in the patching channel 56.

It is understood that the storage elements 304 described above with reference to the patch panel 290 can also be provided in the patch panel 9 of FIGS. 4 to 8.

With reference back to FIG. 3 and similarly to what has been illustrated above with reference to the user module 9, each operator module 10 preferably comprises a respective plurality of support trays 68 of splices between the optical fibre units of the riser cables 51, 52 to the external communication network 2 and the fibre optic unit connection elements 54.

Preferably, the trays 68 are entirely similar to that illustrated above with reference to the trays 35 of the user modules 9, therefore they are not further described here. In an entirely similar way to the trays 35 of the user modules 9, the trays 68 are preferably hinged to a supporting element 72 fixed to one of the walls of the box-shaped body 12 of the operator modules 10, having, for example, a structure entirely similar (not further described here) to that of the supporting element 36 of the trays 35 housed in the user module 9.

Similarly to the user modules 9, the operator modules 10 of the illustrated embodiment further preferably comprise a plurality of winding elements, all indicated at 75, for the optical fibre units of the riser cables 51, 52 to the external communication network 2 and for the fibre optic unit connection elements 54 located outside of the trays 68. Preferably, the winding elements 75 of the operator module 75 have a shape entirely similar (not further described here) to that of the winding elements 46 of the trays 35 housed in the user module 9.

In the preferred embodiment illustrated, the operator modules 10 further preferably comprise a pair of upper and, respectively, lower guide elements 79, 80 for the fibre optic unit connection elements 54 coming out from the compartment 21 of the operator modules 10.

Preferably, the guide elements 79, 80 are positioned in the compartment 22 of the operator modules 10 proximate to the opening 53 formed in the separating wall 63 and are preferably formed by substantially curvilinear guide fins having opposite curvature radii for guiding the fibre optic unit connection elements 54 respectively towards the opening 61 formed in the upper wall 65 of the box-shaped body 12 or towards the opening 60 formed in the lower wall 64 of the box-shaped body 12 of the operator modules 10.

Preferably, the guide elements 79, 80 are shaped such that the optical fibre units of the fibre optic unit connection elements 54 coming out from the operator modules 10 through the opening 60 or through the opening 61 cannot undergo direction changes with curvature radii greater than the aforementioned predetermined minimum value, both in static conditions and in traction conditions induced by handling the elements.

Preferably, at least one of the guide elements 79, 80, for example the element 80, can comprise one or more retention portions 87 perpendicularly projecting from the guide fins and substantially parallel to and spaced from the rear wall 73 of the box-shaped body 12. In this case, the retention portions 87 exert the advantageous function of ensuring that the fibre optic unit connection elements 54 coming out from the opening 53 are effectively maintained in position about the guide elements 79, 80.

In the preferred embodiment illustrated, the operator modules 10 preferably comprise at least one element for storing a portion of the fibre optic unit connection elements 54 coming out from the opening 53 formed in the separating wall 63 arranged between the lower 64 and upper 65 walls of the operator modules 10, for example formed by a substantially cylindrical support 81 extending from the separating wall 63.

Preferably, the substantially cylindrical support 81 is constituted by a plurality of shaped guide fins 82 perpendicularly projecting from the separating wall 63 of the operator modules 10 and having a curvature radius greater than the aforementioned predetermined minimum value (for example 30 mm) so as not to have undesired bends of the fibres.

Preferably, the support 81 comprises one or more retention portions 88 perpendicularly projecting from the guide fins 82 and substantially parallel to and spaced from the separating wall 63. In this case, the retention portions 88 exert the advantageous function of ensuring that the fibre optic unit connection elements 54 coming out from the opening 53 are effectively maintained in position about the support 81.

With reference to the modular system 1 and to the user module 9 described above, a preferred embodiment of a method according to the invention for connecting the external communication network 2 to the user network 3 of the building 4 will now be illustrated.

In a first step of the method, at least one user module 9 is provided, in the preferred example illustrated two user modules 9, each comprising a box-shaped body 11 housing a patch panel 90 or 290 configured to receive adapters 27 for fibre optic connectors. As described above, the user modules 9 can be mounted directly on a wall of the building 4 or on a supporting panel associated to a wall of the building 4, and can be associated with each other by means of a suitable mechanical coupling device.

In a subsequent step, the riser cables 5 of the user network 3, each comprising a plurality of optical fibre units associated to respective selected users, are associated to the user modules 9.

In a subsequent step, the optical fibre units of the riser cables 5 of the user network 3 are associated to respective pigtails 32.

In a further step of the method, at least one operator module is provided, in the preferred example illustrated two operator modules 10, each comprising the inlet opening 50 of the riser cables 51, 52 to the external communication network 2, each connection cable comprising a plurality of optical fibre units.

In a subsequent step, the riser cables 51, 52 and the fibre optic connection elements 54 provided with a connector at a terminal end thereof are associated to the operator modules 10.

In the preferred embodiment illustrated, the step of associating the fibre optic connection elements 54 to the operator modules 10 preferably comprises the steps of providing a plurality of pigtails and associating the optical fibre units of the riser cables 51, 52 to the external communication network 2 to respective pigtails of said plurality of pigtails, thus obtaining fibre optic connection elements 54 connected to the aforementioned external communication network 2.

Once the optical fibre units of the riser cables 5 of the user network 3 are associated to respective pigtails 32 and the optical fibre units of the riser cables 51, 52 of the external communication network 2 are associated to the fibre optic connection elements 54, the method of the invention provides for the step of:

moving the patch panel 90 or 290 from a rest position, wherein it is at least partially housed within the box-shaped body 11 of the user module 9 to a connecting position, wherein it is at least partially extracted from the box-shaped body 11 of the user module 9;

connecting the optical fibre units of the riser cable 5 to respective adapters 27 of the user modules 9, by associating the pigtails 32 thus obtained to the adapters 27;

connecting the connectors 55 of the fibre optic connection elements 54 associated to the operator modules 10 to respective selected adapters 27 of the user module 9, so as to establish the connection between an optical fibre unit associated to a selected user and an optical fibre unit of one of the riser cables 51, 52 of the external communication network 2 after that the patch panel is at least partially extracted from the box-shaped body.

Advantageously, the steps of moving the patch panel 90 or 290 from the rest position to the connecting position comprise a rotation and a translation movement of the patch panel 90 or 290, or alternatively only a translation movement thereof.

Advantageously, the step of connecting the connectors 55 to the adapters 27 of the user modules 9 is carried out by placing the fibre optic connection elements 54 coming out from the operator modules 10 within the patching channel 56 extending within the modular system 1, thereby adequately protecting the fibres housed therein.

In light of what has been illustrated above, it is thus evident that the modular system, the user module and the connection method of the invention allow to achieve the following advantageous technical effects:

i) attaining, in a simple manner, the maximum operating flexibility in the connection of an external communication network to a user network of a building, ii) allowing the installers to carry out the aforementioned connection in a simple and quick manner both in case of a brand new connection, for example during the construction of a building or when a certain dwelling unit is occupied by a user, and in the case of a take over of a previous service operator that one or more users have decided not to use any longer as service provider, iii) allowing the installers to carry out the aforementioned connection in a simple and quick manner without any need of handling any element housed within the user module but advantageously operating on readily accessible elements at least partially extracted from the user module itself

The invention claimed is:

1. A user module for connecting an external communication network to a user network of a building, the user module comprising:
 a box-shaped body comprising an upper wall and a lower wall;
 a plurality of adapters configured to associate to respective optical fibre units of at least one optical cable of the user network; and
 a patch panel, between the upper wall and the lower wall of the box-shaped body, configured to receive the plurality of adapters and configured to define adjacent compartments within the user module;
 wherein the patch panel is housed in the box-shaped body using at least one connection assembly that comprises an engaging element in the patch panel, and
 wherein the engaging element is configured to slide into a corresponding guide element in the box-shaped body so that the patch panel rotates around an axis offset of the patch panel, and
 wherein the patch panel is configured to move between a rest position, at which the patch panel is completely housed within the box-shaped body, and a connecting position, at which the patch panel is at least partially extracted from the box-shaped body.

2. The user module of claim 1, wherein the engaging element comprises a pin projecting from a lower edge of the patch panel, a pin projecting from an upper edge of the patch panel, or a pin projecting from the lower edge of the patch panel and a pin projecting from the upper edge of the patch panel.

3. The user module of claim 1, wherein the guide element comprises at least one aperture in the upper wall of the box-shaped body, in the lower wall of the box-shaped body, or in the upper and lower walls of the box-shaped body.

4. The user module of claim 3, wherein the at least one aperture is substantially rectilinear or substantially curvilinear.

5. The user module of claim 1, wherein the patch panel forms, in the rest position of the patch panel, an angle greater than or equal to 10° and less than or equal to 40° with respect to a transversal plane of the user module.

6. The user module of claim 1, wherein the patch panel comprises at least one guiding element configured to guide the at least one optical cable of the user network during the moving of the patch panel between the rest position and the connecting position.

7. The user module of claim 6, wherein the at least one guiding element comprises a pair of substantially L-shaped superimposed arms projecting from a side wall of the patch panel, and
 wherein the arms define a gap for housing the respective optical fibre units of the at least one optical cable of the user network.

8. The user module of claim 1, further comprising:
 at least one dovetail joint configured to prevent lateral movement of the patch panel in the rest position of the patch panel, configured to prevent bending movement of the upper and lower walls of the box-shaped body in the rest position of the patch panel, or configured to prevent lateral movement of the patch panel and bending movement of the upper and lower walls of the box-shaped body in the rest position of the patch panel.

9. The user module of claim 8, wherein the at least one dovetail joint comprises at least one wedge-shaped protrusion projecting from an upper edge, a lower edge, or the upper and lower edges of the patch panel at an outer end portion of the patch panel, and a mating undercut at an outer end portion of the upper wall of the box-shaped body, the lower wall of the box-shaped body, or the upper and lower walls of the box-shaped body.

10. The user module of claim 1, wherein the patch panel comprises at least one coupling opening formed at a rear edge of the patch panel, and configured to snap engage with a corresponding tongue projecting from a rear wall of the box-shaped body.

11. The user module of claim 1, wherein the patch panel comprises an aperture forming a passage between the defined adjacent compartments within the user module.

12. The user module of claim 11, further comprising:
 a pair of retention arms perpendicularly projecting from the patch panel at the aperture.

13. The user module of claim 1, wherein the patch panel comprises a plurality of openings, each configured to receive a respective adapter of the plurality of adapters, and
 wherein each free opening of the plurality of openings is provided with a frangible tongue.

14. The user module of claim 1, wherein the upper wall and the lower wall of the box-shaped body are configured to detach from the box-shaped body.

15. A method for connecting an external communication network to a user network of a building, the method comprising:
 providing a box-shaped body housing a patch panel between upper and lower walls of the box-shaped body;
 moving the patch panel from a rest position, at which the patch panel is completely housed within the box-shaped body, to a connecting position, at which the patch panel is at least partially extracted from the box-shaped body, by sliding an engaging element of the patch panel into a corresponding guide element in the box-shaped body so that the patch panel rotates around an axis offset of the patch panel; and
 connecting optical fibre units of at least one optical cable of the external communication network to corresponding optical fibre units of an optical cable of the user network through respective adapters received in the patch panel after the patch panel is at least partially extracted from the box-shaped body.

16. The method of claim 15, wherein the moving of the patch panel from the rest position to the connecting position comprises:
rotational and translational movement of the patch panel.

17. The method of claim 15, wherein the box-shaped body is the box-shaped body of a user module, and wherein the method further comprises:
providing at least one operator module that comprises at least one inlet opening of the at least one optical cable of the external communication network;
associating the optical fibre units of the at least one optical cable of the external communication network to the at least one operator module; and
associating a plurality of fibre optic connection elements, connected to the external communication network and provided with connectors at terminal ends of the plurality of fibre optic connection elements, to the at least one operator module.

18. The method of claim 15 comprising moving the patch panel from the connecting position, at which the patch panel is at least partially extracted from the box-shaped body, to the rest position, at which the patch panel is completely housed within the box-shaped body.

19. A user module for connecting an external communication network to a user network of a building, the user module comprising:
a box-shaped body;
a plurality of adapters configured to associate to respective optical fibre units of at least one optical cable of the user network; and
a patch panel, wherein the patch panel is housed in the box-shaped body between upper and lower walls of the box-shaped body,
configured to receive the plurality of adapters and configured to define adjacent compartments within the user module;
wherein the patch panel is configured to move between a rest position, at which the patch panel is completely housed within the box-shaped body, and a connecting position, at which the patch panel is at least partially extracted from the box-shaped body;
at least one dovetail joint configured to prevent lateral movement of the patch panel in the rest position of the patch panel, configured to prevent bending movement of the upper and lower walls of the box-shaped body in the rest position of the patch panel, or configured to prevent lateral movement of the patch panel and bending movement of the upper and lower walls of the box-shaped body in the rest position of the patch panel.

\* \* \* \* \*